United States Patent
Eckl et al.

(10) Patent No.: US 10,462,117 B2
(45) Date of Patent: Oct. 29, 2019

(54) METHOD AND SYSTEM FOR AUTHENTICATING A SURROUNDING WEB APPLICATION BY A WEB APPLICATION THAT IS TO BE EMBEDDED

(71) Applicant: Siemens Aktiengesellschaft, Munich (DE)

(72) Inventors: Roland Eckl, Forchheim (DE); Harald Herberth, Oberasbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/278,966

(22) Filed: Sep. 28, 2016

(65) Prior Publication Data
US 2017/0093838 A1    Mar. 30, 2017

(30) Foreign Application Priority Data
Sep. 29, 2015    (EP) .................................... 15187424

(51) Int. Cl.
*H04L 29/06* (2006.01)
*H04L 29/08* (2006.01)
*H04L 9/32* (2006.01)

(52) U.S. Cl.
CPC .......... *H04L 63/08* (2013.01); *H04L 63/0869* (2013.01); *H04L 63/10* (2013.01); *H04L 67/02* (2013.01); *H04L 9/3273* (2013.01); *H04L 63/168* (2013.01)

(58) Field of Classification Search
CPC .......... H04L 63/08; H04L 63/10; H04L 67/02
See application file for complete search history.

(56) References Cited

U.S. PATENT DOCUMENTS

| | | | |
|---|---|---|---|
| 8,136,148 B1 | 3/2012 | Chayanam et al. | |
| 8,626,865 B1* | 1/2014 | Phillips | G06F 17/30902 709/213 |
| 8,626,885 B2 | 1/2014 | Deslandes et al. | |
| 2009/0327421 A1* | 12/2009 | Fu | G06F 17/3089 709/204 |
| 2009/0328063 A1* | 12/2009 | Corvera | G06F 9/54 719/315 |
| 2015/0143223 A1* | 5/2015 | Kolam | G06F 17/2247 715/234 |

FOREIGN PATENT DOCUMENTS

WO    WO 2011/018060    2/2011

OTHER PUBLICATIONS

Michael Jones, JSON Web Token, May 2015, 29 pages.*

* cited by examiner

*Primary Examiner* — Wasika Nipa
(74) *Attorney, Agent, or Firm* — Cozen O'Connor

(57) ABSTRACT

A method and a system for authenticating a surrounding Web application by a Web application that is to be embedded, wherein it becomes possible for the Web application that is to be embedded to identify the surrounding Web application and for the surrounding Web application to authenticate itself, where a high security standard is provided through storage and evaluation of the necessary key material in the respective. Web server because the key material itself is not transmitted, but only authentication messages for the local use of the key material are instead transmitted.

11 Claims, 2 Drawing Sheets

METHOD AND SYSTEM FOR AUTHENTICATING A SURROUNDING WEB APPLICATION BY A WEB APPLICATION THAT IS TO BE EMBEDDED

BACKGROUND OF THE INVENTION

1. Field of the Invention

The present invention relates to a system and method for authenticating a surrounding Web application (AWA) by a Web application that is to be embedded (AWB).

2. Description of the Related Art

In industrial plants, various multi-vendor systems and applications currently exist alongside one another, such as Supervisory Control and Data Acquisition (SCADA), Manufacturing Execution System (MES) or Distributed Control System (DCS) systems. Some systems in turn consist of a plurality of individual applications, e.g., for engineering and operation. Domain-agnostic applications, for example for communication, document administration/processing and navigation, are obviously also represented in such plants. The user must work across the different applications in many process steps and activities. Many of these systems are available as Web applications that are executed in a browser. Applications of this type are furthermore often integrated with one another in order to operate them via a common user interface.

The applications are often visually integrated with one another (i.e., in the presentation layer), and this applies to Web applications in particular (also known here as "mash-up" or "mashup"). The different applications furthermore develop their own user interface, which is embedded within a higher-order user interface. The details set out below address, in particular, the application authentication of applications, not the authentication of natural persons (user authentication).

Particularly in industrial plants, users/customers or system integrators often wish to combine the different Web applications with one another. However, there are various reasons that may argue against uncontrolled integration. For example, the integration of different applications may be linked to a license, but a customer/integrator does not have an adequate license for the plant. Applications may furthermore reveal sensitive data, so it should be ensured that only trusted applications can be integrated with one another.

For these reasons, the integration of Web applications into other (Web) applications is currently often prevented in principle with technical means. The most common variant in this respect is the prevention in principle of the incorporation of a Web application into other applications, such as where an application recognizes whether it is being executed in a lower-order window, known as an "inline frame" or "iframe" for short, and then refuses the execution. In addition, the use of a Web Application Programming Interface (API) is usually restricted. However, only the client, i.e., the party using an API, authenticates itself here to the API. Typical authentication methods here are API keys, client IDs, authorized URLs, or digitally signed URLs.

An API key is requested once from the API provider for each application and is attached to each request. The disadvantage is that the key is transmitted as clear text. This method is therefore used primarily for billing. Client IDs are also often used instead of a key. The implementation and disadvantages are comparable to API keys. In the case of authorized URLs, entire domains (e.g., http://example.com) are authorized with respect to the APIs that are used. When the API is called, the address of the caller is transferred and double-checked. This approach is strongly dependent on the specific installation of an infrastructure. This method is often combined with other authentication methods, e.g., client ID.

All of these methods address only API calls to a server, wherein the server does not authenticate itself to the caller.

A mutual authentication is known in HTTPS/TLS. However, only clients/servers are authenticated here. This therefore involves a security measure for the transport channel, which provides no authentication at product or application level.

Various authentication methods are similarly known that are used, inter alia, for user authentication and user authorization downstream. However, in the case of various login methods, a check is only performed to ascertain whether a user is allowed to use a specific application. No check is performed to determine whether different applications are (allowed to be) linked to one another.

Whereas numerous means are therefore available to a surrounding Web application for authenticating and therefore allowing and blocking a Web application that is to be embedded, there is a need for improvement with respect to the problem concerning the control facilities a Web application that is to be embedded has with respect to its surrounding Web application.

SUMMARY OF THE INVENTION

In view of the foregoing, it is an object of the present invention, on the part of a Web application that is to be embedded, to control its execution in a surrounding Web application.

This and other objects and advantages are achieved in accordance with the invention by a method and system for the authentication of a surrounding (embedding) Web application by or to a second Web application that is to be embedded, where the surrounding first Web application is executed in a browser and the second application that is to be embedded is provided for running in a separate execution and display area of the surrounding first Web application, and where this surrounding first Web application is provided by at least one first Web server and the second Web application that is to be embedded is provided by at least one second Web server. The surrounding first Web application is authenticated to the second Web application that is to be embedded (AWB), where first key material allocated to the first Web application is usable by the second Web server, where authentication messages are exchanged between the first Web server and the second Web server via the browser, and where the second Web application is activated only in the event of successful authentication or authorization. With the method of the invention, it is possible for a Web application that is to be embedded to identify the surrounding Web application and for the latter to authenticate itself, where a high security standard is provided through the storage and evaluation of the necessary key material in the respective Web server, because the key material itself is not transmitted, but only messages signed via this key material are exchanged. The key material is thereby used without having to be transmitted.

It is also an object of the invention to provide a system for authenticating a surrounding (embedding) first Web application, where a browser is provided to execute the surrounding first Web application, where the second Web application that is to be embedded is provided for running in a separate execution and display area of the surrounding first Web application, and where a first Web server is provided for the provision of the surrounding first Web application and a second Web server is provided for the provision of the second Web application that is to be embedded. The system is configured to perform the method in accordance with the invention. The advantages already explained with reference to the method can be achieved with a system of this type.

For the secure encapsulation of the Web application that is to be embedded, an inline frame ("iframe") is advantageously used as the separate execution and display area in a Web window of the surrounding first Web application. An interface for the exchange of messages is advantageously provided between the inline frame and the surrounding first Web application.

The origin of authentication messages can be checked by determining a domain of the first Web application during the authentication or authorization, where the activation is performed only if a domain provided for this purpose has been determined.

Increased security is provided if it is ensured that a part of the Web application that is to be protected and that is to be embedded is not loaded into the browser or the execution area until the surrounding Web application is authenticated. To achieve this, the second Web application that is to be embedded has a basic part with modules for communicating with the first Web application and/or the browser and for communicating with the second Web server, where the second Web application that is to be embedded also has an application-specific application part, where the basic part is loaded into the separate execution and display area before the authentication or authorization and is started, and where the application part is loaded into the separate execution and display area and is started or put into operation for the activation.

In addition, the surrounding Web application can also be protected against the embedding of an unwanted Web application that is to be embedded by also authenticating in a similar manner the second Web application that is to be embedded to the surrounding first Web application, where second key material allocated to the second Web application is stored on the second Web server and is usable by the first Web server by exchanging authentication messages via the browser, and by loading and/or activating this second Web application (AWB) only in the event of successful authentication or authorization of the second Web application that is to be embedded.

In order to secure the communication, in particular to exchange the authentication and authorization messages, a secure communication link, preferably based on the HTTPS protocol, is established in each case between the first Web server and the first Web application and between the second Web application and the second Web'server before the authentication or authorization of the first and/or the second Web application.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method according to the invention is explained below with reference to the drawing; the example serves simultaneously to explain a system according to the invention, in which.

DETAILED DESCRIPTION OF THE EXEMPLARY EMBODIMENTS

Figure 1:
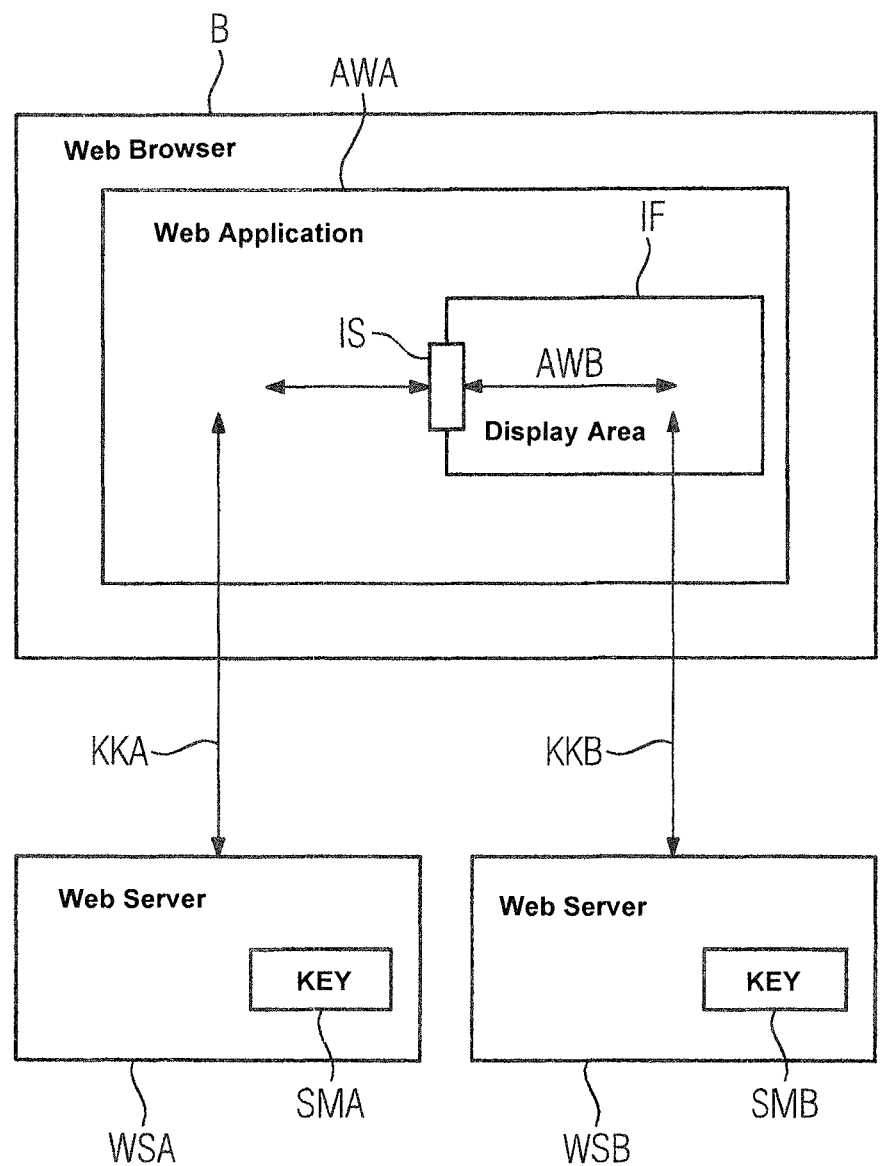
FIG. 1 shows a schematic representation of an arrangement consisting of a browser with a surrounding Web application and a Web application that is to be embedded, where the Web applications have a communication link in each case to a Web server.

FIG. 1 shows a Web browser (browser for short) B running on a computer (not shown) that has set up a communication link via a network (similarly not shown) to the Web servers WSA, WSB. A first Web application AWA, which will also be referred to below as the "surrounding Web application" and which is at least partially supported ("hosted") by the first Web server WSA, is executing in the browser. Similarly, a second Web application AWB, which will also be referred to below as the "Web application that is to be embedded", is at least partially supported ("hosted") by the second Web server WSB. The second Web application that is to be embedded AWB is provided in the surrounding first Web application AWA to run in a separate execution and display area IF, which is designed as an "inline frame" or "iframe". An integration interface IS for exchanging messages or notifications is arranged between the separate execution and display area IF and the first Web application AWA. Communication channels KKA, KKB are furthermore established between the Web applications AWA, AWB and their respectively allocated Web servers WSA, WSB. A first key material SMA that is provided to authenticate and/or authorize the first Web application AWA is stored in the first Web server WSA. Second key material SMB that is provided to authenticate and/or authorize the second Web application AWB is optionally stored in the second Web server WSB. Instead of storing the respective key material SMA, SMB in the corresponding Web servers WSA, WSB, the key material SMA, SMB can also be stored in other components and can be retrieved and/or used by the Web servers WSA, WSB only if required.

The authentication proposed here always occurs between a surrounding Web application and a Web application that is to be embedded AWA, AWB. If a plurality of Web applications that are to be embedded are to be mutually authenticated and integrated, the application authentication is nevertheless always performed indirectly via the (surrounding) Web applications that are common to all, but not directly between one application and another. A direct communication between different Web applications that are to be embedded beyond the methods described for using the integration interface is not provided. Only one second Web application that is to be embedded AWB is considered in the present example for reasons of clarity.

The Web application AMB in each case has a browser-side part that is executed on the machine of the user that also executes the browser B, and a server-side part (which may be a Web server or furthermore a more complex construct with a downstream application server or the like), with respect to which it can be assumed that it can be adequately protected against unauthorized access.

The browser-side part is provided by the server part, runs JavaScript code, for example, and is connected in runtime via a network interface to the Web server WSB.

The Web application AWA additionally develops a well-defined communication interface, e.g., the integration interface IS, that is used to integrate the second Web application that is to be embedded AWB. The Web application that is to be embedded AWB is initially a basic part that is common to all interworking Web applications AWB and may therefore be a standard piece of software. This component supplies the infrastructure for the integration and allows, for example, the communication with the surrounding Web application AWA. The Web application AWB also includes an application part that is application-specific and serves to control the actual user application (e.g. via "API calls"), to be informed by the application of events (via "event subscriptions") and to exchange data. Particularly, this application part of the Web application AWB is to be protected during the authentication.

Conversely, in the case of a surrounding Web application AWA, only a basic interface is often provided that is used to embed Web applications AWB. This comprises both the visual integration and the general communication that represents the counterpart to the basic interface of the Web applications that are to be embedded AWB. Following successful visual embedding and set-up of the communication channel, the Web application AWB can be used via its specific interface (API).

It is advantageous for the proposed application authentication that the surrounding Web application and the Web application that is to be embedded AWA, AWB are isolated from one another, for example, by an iframe. Both applications can thus merely exchange and respond to messages (e.g., via a "postMessage" method). A direct call of code of the respective other Web application AWA, AWB is reliably prevented by the browser B. Messages such as "postMessage" thus represent the basis upon which the basic interface is developed at the higher abstraction level.

The authentication is similarly performed via the basic interface between the surrounding Web application and the Web application that is to be embedded AWA, AWB. Both parties can transmit authentication messages via a generic "sendAuthenticationMessage" method and can receive messages ("handleAuthenticationMessage"). Any authentication methods can be performed via this simple interface through message exchange ("handshake"), but both sides must be able to process the respective messages. If invalid or unknown messages are received, the authentication is terminated as "not authenticated"; the same applies if the result of an authentication is an invalid authentication.

Following a successful authentication, a further authorization can occur if required on the basis thereof, e.g. matching with license information contained in the authentication results and the like.

In order to prevent the improper copying or forwarding of the authentication messages, such as by attackers, the authentication can in each case be linked to domains. A successful authentication must therefore enable the other party to communicate the domain of the application, e.g. as part of a certificate or the like. In the case of the described iframe isolation, the domain of the other party can in each case be checked. In the case of the Web application that is to be embedded AWB, this is achieved, for example, by reading the "document.referrer" browser property of the browser B. This property is administered by the browser B, is write-protected ("read-only") from the application perspective and, in the case of an iframe, always describes the URL of the surrounding web page, i.e., the Web application AWA. It therefore represents the URL of the surrounding Web application AWA from which its domain can in turn be extracted.

In the surrounding Web application AWA, the origin can be checked with each postMessage communication from the message event. This involves the URL of the web page present in the iframe, i.e., the Web application that is to be embedded AWB or its basic component from which its domain can be extracted.

However, the authentication is always performed on the server side of the respective Web applications AWA, AWB, where the key material SMA, SMB or the like is also located. Only messages required for this purpose are channeled through the browser B. The interception of or eavesdropping on the messages cannot therefore be exploited by an attacker, in particular through the use of a secure communication protocol, such as Hypertext Transfer Protocol (HTTPS) and in that the key material SMA, SMB does not normally have to be communicated, but is only used locally in the Web servers WSA, WSB.

The actual domain matching should be undertaken in the respective server parts as a sub-step of the "handshake".

If a Web application AWA is neither authenticated nor authorized, the application-specific interface of the Web application AWB is not developed or the Web application AWB ignores corresponding calls to it. The Web application AWB can similarly display or otherwise present a corresponding notification in its visual area that a use is not currently possible. Conversely, a surrounding Web application AWA can, if necessary, completely remove a non-authenticated/authorized Web application AWB from its user interface (UI).

If one of the two Web applications AWA, AWB requires an authentication of the respective other Web application AWA, AWB, it transmits a corresponding message, as a result of which the authentication process is started. This should usually happen immediately after the visual embedding during the application start of the Web application AWB, but is, in principle, also possible at any later time. Depending on the underlying authentication or authorization method, the process can be terminated positively or negatively following the exchange of one or more messages, whereupon the application interface(s) of the Web application AWA, AWB requesting the authentication authorization, the API, is/remains available or not.

Data relevant to the authentication (e.g., private key material SMA, SMB) is always present in the associated Web servers WSA, WSB (or downstream further servers) and is separately access-protected there.

During the authentication, the domain of the other party can be determined in a secure manner as it is contained in a "forgery-proof claim". As described above, the applications can determine the actual domain of the other party, so that it can be ensured that the authentication has actually occurred with the application located directly on the interface.

The described method can be extended into a two-phase approach. In a first phase, a trusted communication of the interworking applications can be ensured, such as based on HTTPS. In the case of non-trusted sources (i.e., sources without a valid certificate), an integration of the Web applications that are to be embedded AWB via an iframe IF automatically prevents their further incorporation. The position of trust required for this purpose is produced by the customer on the infrastructure side and serves primarily for the customer's security. Following a successful first phase, the Web applications that are to be integrated with one another AWA, AWB authenticate themselves in the second phase in accordance with the approach described above, i.e., the Web application that is to be embedded AWB in relation to the surrounding first Web application AWA, and/or vice versa.

The proposed approach addresses the initially presented aims of licensing, the position of mutual trust of Web applications and integrity protection. In addition, the approach allows a plurality of (even proprietary) methods to be used via the generic interface and to be combined with one another if necessary, e.g., a general application authentication with a license check, etc. The key material remains on the respective Web server and is therefore not readable by users. Only authentication messages are channeled via the browser B, without revealing sensitive data there.

In contrast to known solutions, it is possible to use the interface of the Web application that is to be integrated AWB without initiating any call from the server component or disclosing relevant key material or the like. In contrast to "service accounts", the Web applications AWA, AWB mutually authenticate themselves without the need for a central infrastructure in the form of an "identity provider". Generally speaking, no intervention in or administration of the infrastructure is required. However, it is still possible to include infrastructure-specific aspects (e.g., licensing).

Figure 2:
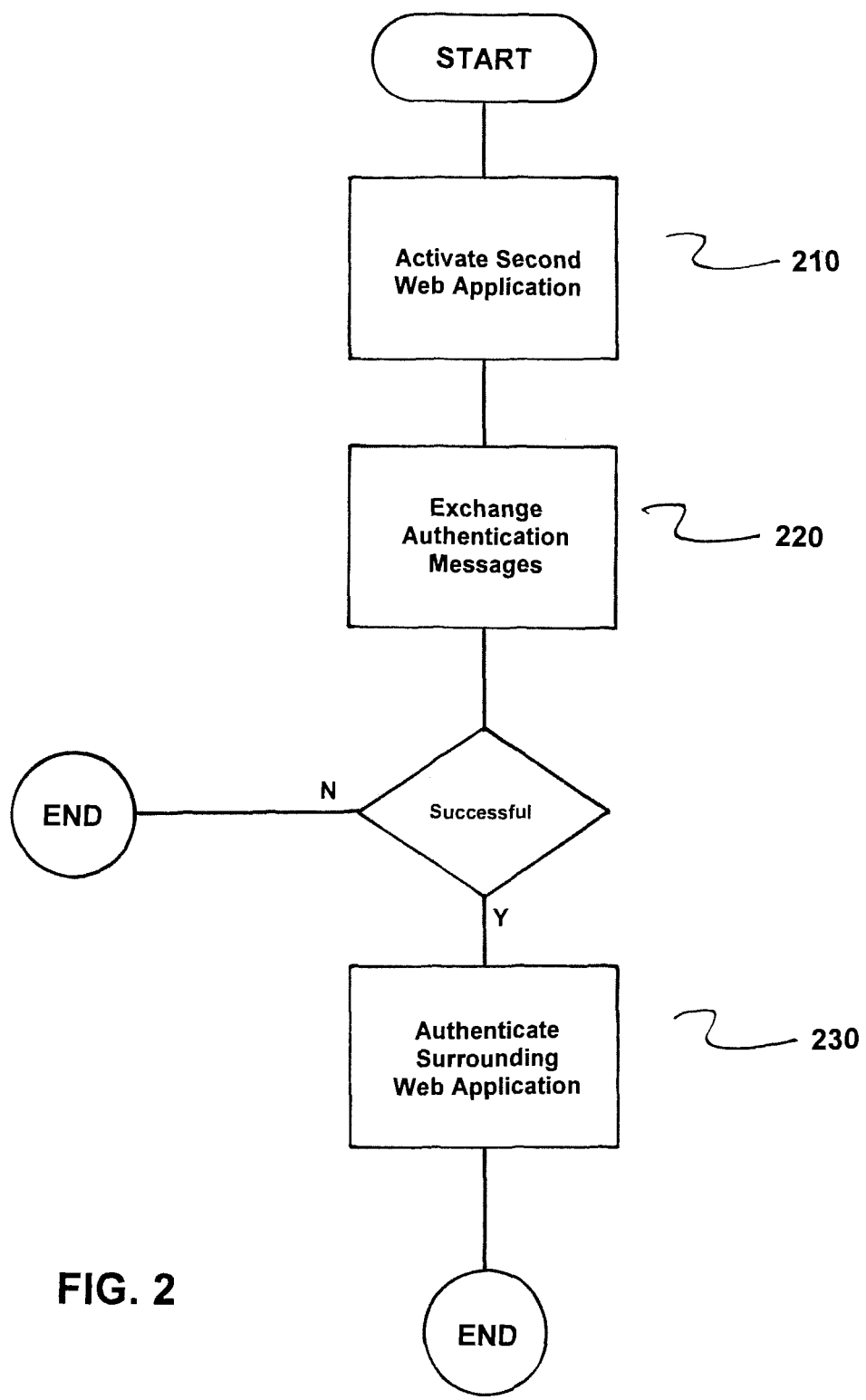
FIG. 2 is a flowchart of the method in accordance with the invention.

FIG. 2 is a flowchart of a method for authenticating a surrounding Web application (AWA) by a Web application that is to be embedded (AWB). In accordance with the invention, the surrounding first Web application (AWA) is executed in a browser (B) and the second application that is to be embedded (AWB) is provided for execution in a separate execution and display area (IF) of the surrounding first Web application (AWA), and the surrounding first Web application (AWA) is provided by at least one first Web server (WSA) and the second Web application that is to be embedded (AWB) is provided by at least one second Web server (WSB). The method comprises authenticating the surrounding first Web application (AWA) to the second Web application that is to be embedded (AWB), as indicated in step 210. Here, first key material (SMA) allocated to the first Web application (AWA) is usable by the second Web server (WSB).

Next, authentication messages between the first Web server (WSA) and the second Web server (WSB) via the browser (B) are exchanged, as indicated in step 220. The second Web application (AWB) is now only activated in the event of successful authentication or authorization, as indicated in step 230.

Thus, while there have shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for authenticating a surrounding first Web application by a second Web application before embedding the second Web application in the surrounding first Web application, the surrounding first Web application being executed in a browser, the second Web application after being embedded in the surrounding first Web application being executed in a separate execution and display area of the surrounding first Web application, the surrounding first Web application being provided by at least one first Web server, and the second Web application subsequent to being embedded in the surrounding first Web application being provided by at least one second Web server, the method comprising:

authenticating the surrounding first Web application to the second Web application before embedding the second Web application in the first Web application, a first key utilized during the authentication being stored in the at least one first Web server, the first key utilized during the authentication being allocated to the surrounding first Web application the first key being utilized to sign the authentication messages utilized by the at least one second Web server, and the first key remaining within the at least one first Web server at all times;

exchanging the authentication messages signed via the first key between the at least one first Web server and the at least one second Web server via the browser; and activating the second Web application only in an event of successful authentication or authorization.

2. The method as claimed in claim 1, wherein an inline frame ("iframe") in a Web window of the surrounding first Web application serves as the separate execution and display area.

3. The method as claimed in claim 1, wherein an interface is utilized to exchange authentication messages between the separate execution and display area and the surrounding first Web application.

4. The method as claimed in claim 2, wherein an interface is utilized to exchange authentication messages between the separate execution and display area and the surrounding first Web application.

5. The method as claimed in claim 1, wherein a domain of the first Web application is determined during the authentication or authorization; and wherein the activation is performed only if a domain provided for this purpose has been determined.

6. The method as claimed in claim 1, wherein the second Web application that is to be embedded includes a basic part having modules for communicating with at least one of (i) the first Web application and (ii) the browser, and for communicating with the second Web server;

wherein the second Web application that is to be embedded additionally includes an application-specific application part;

wherein the basic part is loaded into the separate execution and display area before the authentication or authorization is started; and wherein the application part is loaded into the separate execution and display area and started or placed into operation for the activation.

7. The method as claimed in claim 6, wherein the second Web application that is to be embedded is authenticated to the surrounding first Web application in a similar manner;

wherein a second key allocated to the second Web application is stored on the second Web server and is utilized by the first Web server via exchange of authentication messages via the browser; and wherein the second Web application is activated only in the event of successful authentication or authorization of the second Web application that is to be embedded.

8. The method as claimed in claim 7, wherein the basic part is loaded into the separate execution and display area and is started before the authentication or authorization of the first Web application; and
wherein the first Web application is authenticated or its authorization is checked before loading the application part into the separate execution and display area.

9. The method as claimed in claim 1, wherein before the authentication or authorization of at least one of (i) the first Web application and (ii) the second Web application, a secure communication link, based on the HTTPS protocol, is established in each case between the first Web server and the first Web application and between the second Web application and the second Web server.

10. The method as claimed in patent claim 9, wherein the secure communication link is based on the Hypertext Transfer Protocol, established in each case between the first Web server and the first Web application and between the second Web application and the second Web server.

11. A system for authenticating a surrounding first Web application by a second Web application before embedding the second Web application in the surrounding first web application, the system comprising:
a computer;
a browser running on the computer for executing the surrounding first Web application, the second application that is to be embedded being executed in the surrounding first web application in a separate execution and display area of the surrounding first Web application;
a first Web server for providing the surrounding first Web application; and
a second Web server for providing the second Web application that is to be embedded in the surrounding first web application;
wherein the system is configured to:
authenticate the surrounding first Web application to the second Web application before embedding the second Web application in the surrounding first web application, a first key utilized during the authentication being stored in the at least one first Web server, the first key utilized during the authentication being allocated to the surrounding first Web application, the first key being utilized to sign authentication messages utilized by the at least one second Web server, and the first key remaining within the first Web server at all times;
exchange the authentication messages signed via the first key between the first Web server and the second Web server via the browser; and
activate the second Web application only in an event of successful authentication or authorization.

\* \* \* \* \*